(12) United States Patent  (10) Patent No.: US 7,995,106 B2
Oishi  (45) Date of Patent: Aug. 9, 2011

(54) IMAGING APPARATUS WITH HUMAN EXTRACTION AND VOICE ANALYSIS AND CONTROL METHOD THEREOF

(75) Inventor: Makoto Oishi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 604 days.

(21) Appl. No.: 12/073,234

(22) Filed: Mar. 3, 2008

(65) Prior Publication Data

US 2008/0218603 A1  Sep. 11, 2008

(30) Foreign Application Priority Data

Mar. 5, 2007  (JP) ................................. 2007-053644
Mar. 5, 2007  (JP) ................................. 2007-053645
Mar. 5, 2007  (JP) ................................. 2007-053646

(51) Int. Cl.
    *H04N 5/228* (2006.01)
(52) U.S. Cl. .................................................. 348/222.1
(58) Field of Classification Search ............... 348/222.1, 348/231.3, 231.4, 161, 211.99, 211.6, 211.9
    See application file for complete search history.

(56) References Cited

U.S. PATENT DOCUMENTS

| | | | | |
|---|---|---|---|---|
| 6,377,995 B2 * | 4/2002 | Agraharam et al. | ......... | 709/231 |
| 6,919,892 B1 * | 7/2005 | Cheiky et al. | ................. | 345/473 |
| 6,996,340 B2 | 2/2006 | Yamaguchi et al. | | |
| 7,038,715 B1 * | 5/2006 | Flinchbaugh | ............ | 348/207.99 |
| 7,224,851 B2 * | 5/2007 | Kinjo | ............................ | 382/276 |
| 7,369,685 B2 * | 5/2008 | DeLean | ........................ | 382/118 |
| 7,525,575 B2 * | 4/2009 | Rees et al. | ................ | 348/211.99 |
| 7,639,282 B2 * | 12/2009 | Kaneda et al. | ............. | 348/222.1 |
| 7,650,014 B2 | 1/2010 | Ikeda et al. | | |
| 7,675,635 B2 | 3/2010 | Tsue et al. | | |
| 7,821,541 B2 * | 10/2010 | Delean | ........................ | 348/211.1 |
| 2003/0001846 A1 * | 1/2003 | Davis et al. | ................... | 345/474 |
| 2003/0112259 A1 * | 6/2003 | Kinjo | ............................ | 345/700 |
| 2005/0196044 A1 | 9/2005 | Nagahashi et al. | | |
| 2005/0200722 A1 | 9/2005 | Ono | | |
| 2006/0222214 A1 * | 10/2006 | Kaneda et al. | ................ | 382/115 |

FOREIGN PATENT DOCUMENTS

| | | |
|---|---|---|
| CN | 1910613 A | 2/2007 |
| JP | 2000-004435 | 1/2000 |
| JP | 2000-196934 | 7/2000 |

(Continued)

OTHER PUBLICATIONS

Translation of Japanese pub No. 2005-318084.*

(Continued)

*Primary Examiner* — Nicholas G Giles

(74) *Attorney, Agent, or Firm* — McGinn IP Law Group, PLLC

(57) ABSTRACT

A digital camera has human extraction means, non-human extraction means, and composition judgment means. The human extraction means extracts a human figure region by analysis of image data. The non-human extraction means extracts a major subject other than a human figure by analysis of a region other than the human figure region having been extracted by the human extraction means. The composition judgment means evaluates arrangement of the human figure and the major subject according to results of the extraction, and judges whether composition is appropriate. Based on whether the composition is appropriate, timing to record the image data is determined. Preferably, recording means is controlled so as to record the image data at the determined timing, or the timing is notified to a user.

13 Claims, 14 Drawing Sheets

FOREIGN PATENT DOCUMENTS

| | | |
|---|---|---|
| JP | 2001-51338 | 2/2001 |
| JP | 2002-373330 | 12/2002 |
| JP | 2003-338955 | 11/2003 |
| JP | 2004-294498 | 10/2004 |
| JP | 2005-51541 A | 2/2005 |
| JP | 2005-122139 | 5/2005 |
| JP | 2005-175684 | 6/2005 |
| JP | 2005-182767 | 7/2005 |
| JP | 2005-269562 | 9/2005 |
| JP | 2005-303991 | 10/2005 |
| JP | 2005-318084 A | 11/2005 |
| JP | 2006-184589 | 7/2006 |
| JP | 2006-191524 | 7/2006 |
| JP | 2006-203346 | 8/2006 |
| JP | 2006-270921 | 10/2006 |
| JP | 2006-350578 | 12/2006 |

OTHER PUBLICATIONS

Japanese Office Actions dated Dec. 14, 2010 (with partial English translations).

Japanese Office Action dated Mar. 29, 2011 (with a partial English translation).

* cited by examiner

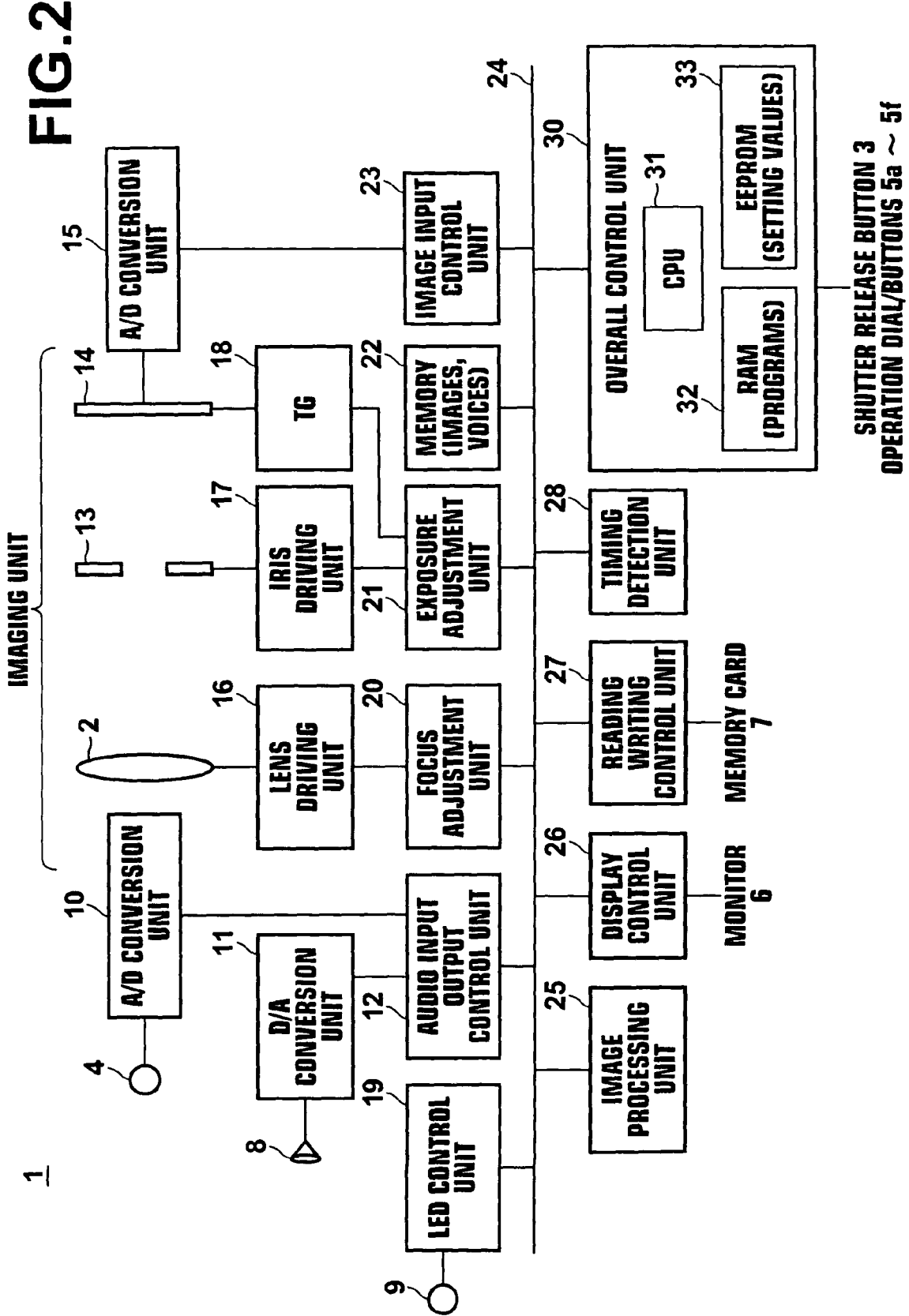

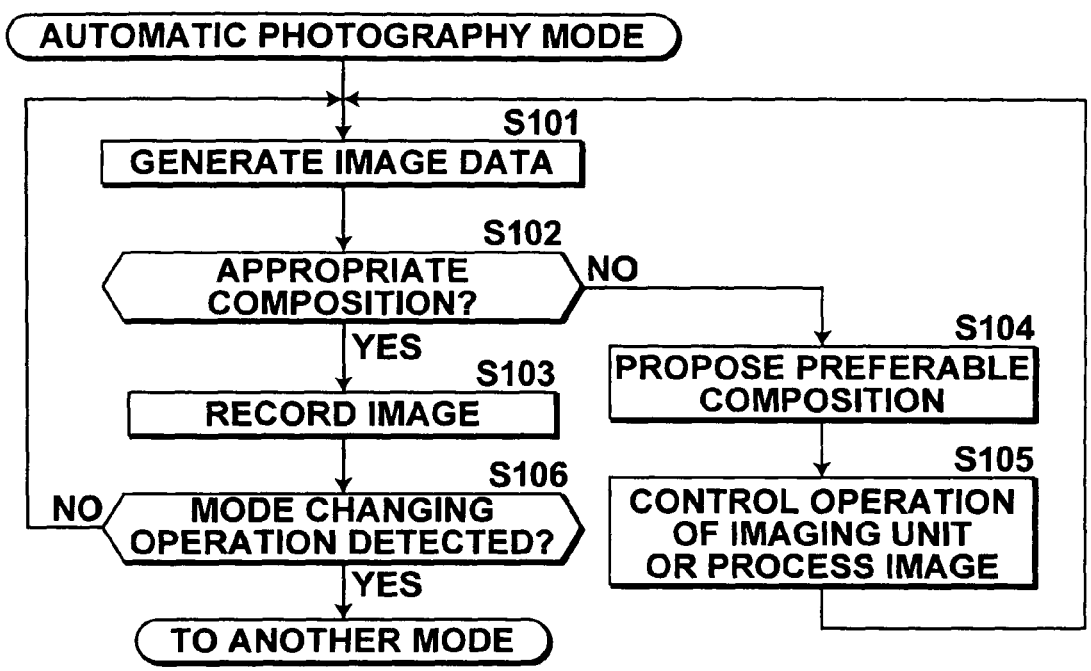
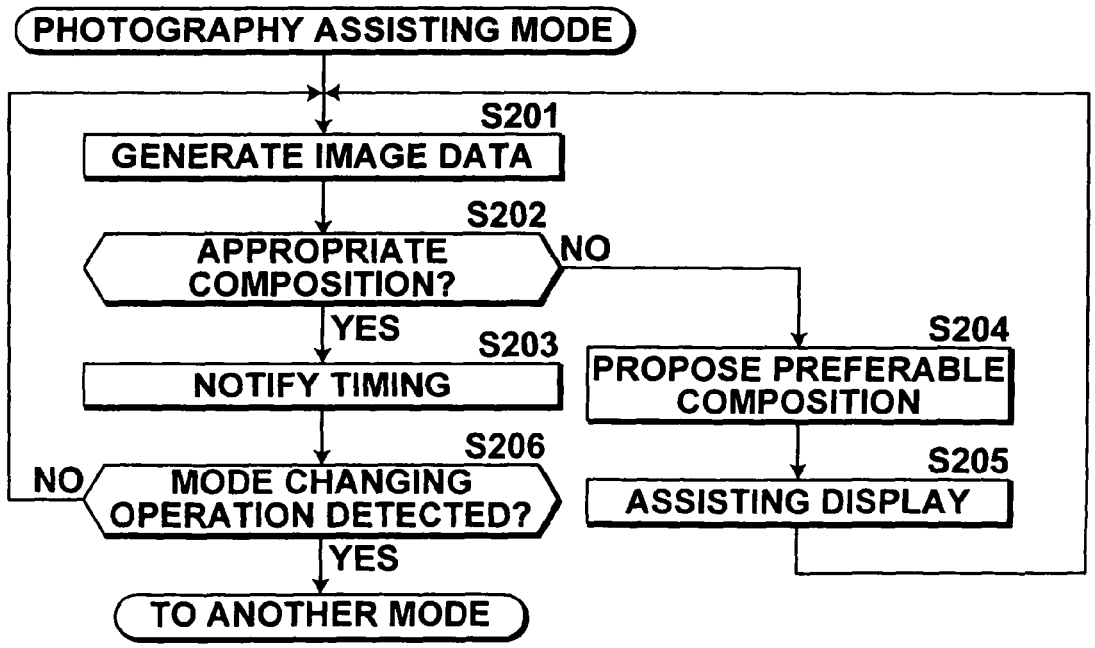

IMAGING APPARATUS WITH HUMAN EXTRACTION AND VOICE ANALYSIS AND CONTROL METHOD THEREOF

BACKGROUND OF THE INVENTION

1. Field of the Invention

The present invention relates to an imaging apparatus that carries out photography control based on composition of an image to be photographed, and to a control method thereof. The present invention also relates to an imaging apparatus that carries out automatic photography by using a voice as a trigger and to a control method thereof.

2. Description of the Related Art

AE (Auto Exposure) and AF (Auto Focus) functions of digital cameras have been improved year by year, and even people who are not familiar with operating cameras can photograph clear images of bright colors. However, a manner of image capturing with a camera and when to press a shutter release button still remain dependent on skills of photographers. Therefore, it is still difficult for beginners to photograph images in appropriate composition.

In order to solve this problem, Japanese Unexamined Patent Publication No. 2001-051338 discloses a camera that controls a recording operation based on judgment as to whether a person faces a predetermined direction by recognizing orientation of the person's face. However, Japanese Unexamined Patent Publication No. 2001-051338 discloses a method of controlling photography for the case where only one person is photographed, and does not disclose any method for controlling photography for the case where a plurality of persons or a target other than a person are/is photographed. Meanwhile, Japanese Unexamined Patent Publication No. 2006-203346 discloses a camera that sets a photography condition by analyzing composition of a photographed scene. However, Japanese Unexamined Patent Publication No. 2006-203346 proposes photography control by detecting the sky in addition to a human face and by detecting inclination of a subject image, and discloses no specific method of controlling photography of a target other than a human face and the sky.

As another measure to solve the above problem, acquisition of an image in appropriate composition has been attempted by controlling timing of image data recording based on an image obtained before a shutter release button is pressed. Japanese Unexamined Patent Publication No. 2000-196934 discloses an imaging apparatus that pays attention to a predetermined portion of an image being photographed and operates a shutter when the portion is changed. However, the imaging apparatus carries out the control by paying attention only to the predetermined portion specified by a user, and does not carry out photography control in consideration of composition of an entire image.

Furthermore, digital cameras that carry out automatic photography by using a specific voice as a trigger indicating a photograph opportunity have been proposed as still another measure to solve the problem. For example, Japanese Unexamined Patent Publication No. 2006-184589 discloses a digital camera that obtains an image by an automatic photography operation when a specific phrase inputted from a microphone of the camera is detected through recognition thereof. However, although digital cameras that carry out automatic photography by using a voice as a trigger are convenient, the cameras sometimes carry out an unnecessary operation in response to an irrelevant voice. For example, in a place such as a sightseeing spot where a large number of people gather, such a camera may respond to a voice of a nearby stranger. In the case of photography of a class photo, such a camera may carry out photography when a person says "Say cheese" regardless of uncompleted photography preparation.

SUMMARY OF THE INVENTION

The present invention solves the above problem in conventional techniques, and an object of the present invention is to provide an imaging apparatus that enables a beginner to photograph an image in appropriate composition with ease. Another object of the present invention is to solve inconveniency of unnecessarily carried out automatic photography operation while maintaining convenience of automatic photography using a voice as a trigger.

In order to achieve the objects described above, the present invention provides three types of imaging apparatuses.

A first imaging apparatus comprises imaging means for generating image data representing a scene by photography thereof, and recording means for recording the image data generated by the imaging means in a predetermined recording medium. The first imaging apparatus further comprises human extraction means, non-human extraction means, composition judgment means, and recording timing determination means, all of which will be described below.

The human extraction means extracts an image region or image regions representing a human figure or human figures by analyzing the image data generated by the imaging means. For example, the human extraction means carries out human face search in the image data, and outputs information representing the number of human faces found through the search and a position and a size of each of the human faces as a result of the extraction. In this case, a facial expression of the face or faces detected in the search may be recognized so that information representing the recognized facial expression can further be outputted. In addition, the human extraction means may recognize a gesture of the human figure or figures included in the image data so that information representing the recognized gesture can be outputted as the extraction result.

The non-human extraction means extracts a major subject other than the human figure or figures by analyzing an image region other than the image region or regions extracted by the human extraction means from the image data generated by the imaging means. For example, the non-human extraction means extracts the major subject by carrying out filtering processing using a high-pass filter on the image data. Alternatively, the non-human extraction means may recognize a predetermined pre-registered target among targets included in the image data, to extract the target as the major subject. In addition, the non-human extraction means may extract the major subject by using both the methods described above.

The composition judgment means evaluates whether an arrangement of the human figure or figures and the major subject other than the human figure or figures satisfies a predetermined condition according to the extraction result by the human extraction means and a result of the extraction by the non-human extraction means, and judges appropriateness of composition of the image data according to the evaluation of the arrangement.

The recording timing determination means determines timing to record the image data, based on a result of the judgment by the composition judgment means.

In an embodiment of the present invention, the first imaging apparatus comprises recording control means for controlling the recording means so as to record the image data at the timing determined by the recording timing determination means, in addition to the imaging means, the recording means, the human extraction means, the non-human extraction means, the composition judgment means, and the recording timing determination means. In this embodiment, the image data are recorded automatically when an image in appropriate composition is photographed. Therefore, images in appropriate composition can always be obtained regardless of skills of a photographer.

In another embodiment of the present invention, the first imaging apparatus comprises notification means for notifying the timing determined by the recording timing determination means. Upon notification by the notification means, a photographer knows the timing at which an image is obtained in appropriate composition. Therefore, by pressing a shutter release button at the notified timing, the image can be obtained in appropriate composition with ease.

The first imaging apparatus of the present invention may further comprise composition proposing means for determining an arrangement of the human figure or figures and the major subject that satisfies the predetermined condition by using the results of the extraction by the human extraction means and the non-human extraction means, and photography control means for controlling an operation of the imaging means so as to generate image data in which the human figure or figures and the major subject are laid out in the arrangement determined by the composition proposing means. In the configuration comprising the composition proposing means and the photography control means, in the case where the composition of a photographed image is not appropriate, an operation (such as a magnification) of the imaging means is changed thereafter. Therefore, the composition is improved, and an image in appropriate composition can be obtained fast.

The first imaging apparatus of the present invention may comprise the composition proposing means described above and image processing means for carrying out image processing on the image data so as to cause the arrangement of the human figure or figures and the major subject to agree with the arrangement determined by the composition proposing means. In the configuration comprising the composition proposing means and the image processing means, an image in appropriate composition can also be automatically generated by the image processing in the case where a photographed image is not in appropriate composition. Therefore, the image can be obtained fast in appropriate composition.

It is preferable for the recording means to record the extraction results by the human extraction means and the non-human extraction means together with the image data in the recording medium. In this manner, when the image data recorded in the recording medium are edited on a personal computer or the like, the image data can be edited with use of the extraction results.

In addition to the means described above, the first imaging apparatus may comprise voice analysis means for detecting a predetermined characteristic related to a voice by analysis of an inputted voice. For example, the voice analysis means detects a predetermined volume change, a predetermined phrase, or a characteristic that has been pre-registered as a characteristic of a voice of a predetermined person, as the predetermined characteristic. In this case, the composition judgment means judges appropriateness of the composition of the image data, based on the predetermined characteristic detected by the voice analysis means and the arrangement evaluation having been described above. Furthermore, it is preferable for the recording means in this case to record the extraction results by the human extraction means and the non-human extraction means and a result of the detection by the voice analysis means in the recording medium, together with the image data. The image data can be recorded at more appropriate timing by consideration of the voice in addition to the evaluation upon judgment of the composition.

A first control method of the present invention is a method that causes an imaging apparatus to operate as the first imaging apparatus described above by controlling the apparatus in the following manner. Firstly, an image region representing a human figure is extracted by analysis of image data obtained by imaging means. A major subject other than the human figure is extracted by analysis of an image region other than the image region representing the human figure in the image data generated by the imaging means. Whether an arrangement of the extracted human figure and the major subject satisfies a predetermined condition is evaluated, and judgment is made as to whether composition of the image data is appropriate, based on the evaluation of the arrangement. Timing of recording the image data is then determined based on a result of the judgment on the composition. In an embodiment of the present invention, recording means is controlled so as to record the image data at the determined timing. In another embodiment, a user is notified of the determined timing by control of an operation of predetermined output means such as a monitor, a speaker, or a lamp.

A second imaging apparatus of the present invention comprises imaging means for generating image data representing a scene by photography of the scene, and recording means for recording the image data generated by the imaging means in a predetermined recording medium. The second imaging apparatus has human extraction means, voice analysis means, composition judgment means, and recording timing determination means, all of which will be described below.

The human extraction means extracts an image region or image regions representing a human figure or human figures by analyzing the image data generated by the imaging means. For example, the human extraction means carries out human face search in the image data, and outputs information representing the number of human faces found through the search and a position and a size of each of the human faces as an extraction result. In this case, a facial expression of the face or faces detected in the search may be recognized so that information representing the recognized facial expression can further be outputted. In addition, the human extraction means may recognize a gesture of the human figure or figures included in the image data so that information representing the recognized gesture can be outputted as the extraction result.

The voice analysis means detects a predetermined characteristic related to a voice by analysis of an inputted voice. For example, the voice analysis means detects a predetermined volume change, a predetermined phrase, or a characteristic that has been pre-registered as a characteristic of a voice of a predetermined person, as the predetermined characteristic. The composition judgment means judges whether composition of the image data is appropriate, based on the extraction result by the human extraction means and a result of the detection by the voice analysis means.

The recording timing determination means determines timing of recording the image data, based on a result of the judgment by the composition judgment means.

In an embodiment of the present invention, the second imaging apparatus comprises recording control means for controlling the recording means so as to record the image data at the timing determined by the recording timing determination means, in addition to the imaging means, the recording means, the human extraction means, the composition judgment means, and the recording timing determination means. In this embodiment, even in the case where the voice as a trigger of automatic photography is produced, automatic photography is not carried out if the composition does not satisfy the predetermined condition. Therefore, there is no need to worry about unnecessary photography in response to the voice alone.

In another embodiment, the second imaging apparatus comprises notification means for notifying the timing determined by the recording timing determination means. The second imaging apparatus in this embodiment does not carry out automatic photography. However, the imaging apparatus notifies a user of the timing to press a shutter release button in the case where the composition satisfies the predetermined condition and the voice of the predetermined characteristic is also produced. Therefore, the user can benefit from the same convenience as automatic photography. In addition, since a photography operation is not carried out automatically, the imaging apparatus does not carry out an unnecessary operation against an intention of the user.

It is preferable for the recording means to record the extraction result by the human extraction means and the detection result by the voice analysis means together with the image data in the recording medium. In this manner, when the image data recorded in the recording medium are edited on a personal computer or the like, the image data can be edited with use of the extraction result.

A second control method of the present invention is a method that causes an imaging apparatus to operate as the second imaging apparatus described above, by controlling the imaging apparatus in the following manner. Firstly, an image region representing a human figure is extracted by analysis of image data generated by imaging means. In parallel to the extraction, a predetermined characteristic related to a voice is detected by analysis of an inputted voice. Thereafter, based on a result of the human figure extraction and a result of the voice detection, whether composition of the image data is appropriate is judged. Timing to record the image data is then determined based on a result of the judgment. In an embodiment, recording means is controlled so as to record the image data at the determined timing. In another embodiment, a user is notified of the determined timing by control of an operation of predetermined output means.

A third imaging apparatus of the present invention comprises imaging means for generating image data representing a scene by photography thereof, and recording means for recording the image data generated by the imaging means in a predetermined recording medium. The third imaging apparatus further comprises human extraction means, non-human extraction means, composition judgment means, and composition proposing means, all of which will be described below.

The human extraction means extracts an image region or image regions representing a human figure or human figures by analyzing the image data generated by the imaging means. For example, the human extraction means carries out human face search in the image data, and outputs information representing the number of human faces found through the search and a position and a size of each of the human faces as an extraction result. In this case, a facial expression of the face or faces detected in the search may be recognized so that information representing the recognized facial expression can further be outputted. In addition, the human extraction means may recognize a gesture of the human figure or figures included in the image data so that information representing the recognized gesture can be outputted as the extraction result.

The non-human extraction means extracts a major subject other than the human figure or figures by analyzing an image region other than the image region or regions extracted by the human extraction means from the image data generated by the imaging means. For example, the non-human extraction means extracts the major subject by carrying out filtering processing using a high-pass filter on the image data. Alternatively, the non-human extraction means may recognize a predetermined pre-registered target among targets included in the image data, to extract the target as the major subject. In addition, the non-human extraction means may extract the major subject by using both the methods described above.

The composition judgment means evaluates whether an arrangement of the human figure or figures and the major subject other than the human figure or figures satisfies a predetermined condition according to the result of extraction by the human extraction means and a result of extraction by the non-human extraction means, and judges appropriateness of composition of the image data according to the evaluation of the arrangement. The composition proposing means determines an arrangement of the human figure or figures and the major subject that satisfies the predetermined condition, by using the extraction results by the human extraction means and the non-human extraction means.

In an embodiment of the present invention, the third imaging apparatus comprises photography control means for controlling an operation of the imaging means so as to generate image data in which the human figure or figures and the major subject are laid out in the arrangement determined by the composition proposing means, in addition to the imaging means, the recording means, the human extraction means, the non-human extraction means, the composition judgment means, and the composition proposing means. According to the imaging apparatus in this embodiment, in the case where the composition of a photographed image is not appropriate, an operation (such as a magnification) of the imaging means is changed thereafter. Therefore, the composition is improved automatically.

In another embodiment of the present invention, the third imaging apparatus comprises image processing means for carrying out image processing on the image data so as to cause the arrangement of the human figure or figures and the major subject to agree with the arrangement determined by the composition proposing means. According to the imaging apparatus in this embodiment, in the case where the composition of a photographed image is inappropriate, an image having preferable composition is automatically generated by the image processing, and the composition is improved.

The third imaging apparatus may comprise recording control means for determining timing of recording the image data according to a result of the judgment by the composition judgment means and for controlling the recording means so as to record the image data at the determined timing. In the configuration having the recording control means, the image data are recorded automatically at the time an image is obtained in appropriate composition. Therefore, images in appropriate composition can always be obtained regardless of skills of a photographer.

Alternatively, instead of the recording control means described above, the third imaging apparatus may comprise notification means for determining, the timing of recording the image data according to the result of judgment by the composition judgment means and for notifying the determined timing. In the configuration having the notification means, a photographer is notified of the timing to photograph an image in appropriate composition. Therefore, by pressing a shutter release button at the notified timing, the image can be obtained in appropriate composition.

It is preferable for the recording means to record the extraction results by the human extraction means and the non-human extraction means together with the image data in the recording medium. In this manner, when the image data recorded in the recording medium are edited on a personal computer or the like, the image data can be edited with use of the extraction results.

In addition to the means described above, the third imaging apparatus may further comprise voice analysis means for detecting a predetermined characteristic related to a voice by analysis of an inputted voice. For example, the voice analysis means detects a predetermined volume change, a predetermined phrase, or a characteristic that has been pre-registered as a characteristic of a voice of a predetermined person, as the predetermined characteristic. In this case, the composition judgment means judges whether the composition of the image data is appropriate, based on the voice characteristic detected by the voice analysis means and the arrangement evaluation having been described above. It is preferable for the recording means in this case to record the extraction results by the human extraction means and the non-human extraction means and a result of the detection by the voice analysis means in the recording medium, together with the image data. The image data can be recorded at more appropriate timing by consideration of the voice in addition to the evaluation upon judgment of the composition.

A third control method of the present invention is a method that causes an imaging apparatus to operate as the third imaging apparatus described above, by controlling the imaging apparatus in the following manner. Firstly, an image region representing a human figure is extracted by analysis of image data generated by imaging means. A major subject other than the human figure is then extracted from the image data generated by the imaging means, by analysis of an image region other than the image region representing the human figure. Thereafter, whether an arrangement of the extracted human figure and the major subject satisfies a predetermined condition is evaluated, and whether composition of the image data is appropriate is judged based on the evaluation. An arrangement satisfying the predetermined condition is then determined for the extracted human figure and the major subject. In an embodiment, an operation of the imaging means is controlled so as to generate image data in which the human figure and the major subject are arranged in the determined arrangement. In another embodiment, image processing is carried out on the image data so as to cause the arrangement of the human figure and the major subject other than the human figure to agree with the determined arrangement.

BRIEF DESCRIPTION OF THE DRAWINGS

FIG. 2 shows the internal configuration of the digital camera;
FIG. 3 is a flow chart showing an operation of the digital camera (in automatic photography mode);
FIG. 4 is a flow chart showing an operation of the digital camera (in photography assisting mode)

DESCRIPTION OF THE PREFERRED EMBODIMENT

Hereinafter, a digital camera that carries out operation control by selectively using a plurality of control methods will be disclosed as an embodiment of a method and an apparatus of the present invention. The digital camera has four operation modes comprising ordinary photography mode, image playback mode, automatic photography mode, and photography assisting mode.

Figure 1A:
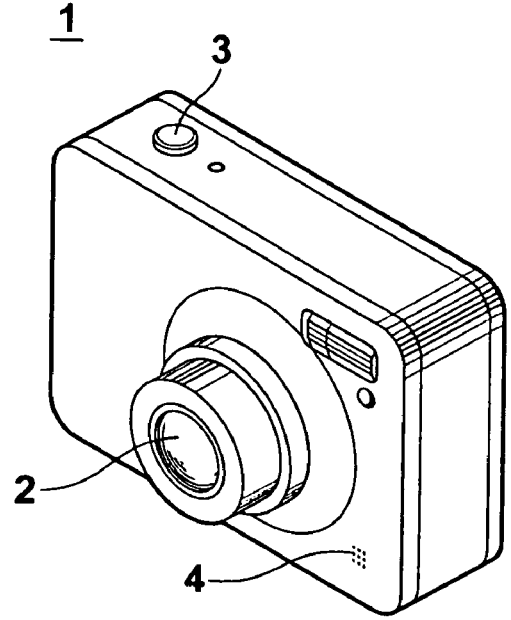
FIG. 1A shows a frontal perspective view of a digital camera.
Figure 1B:
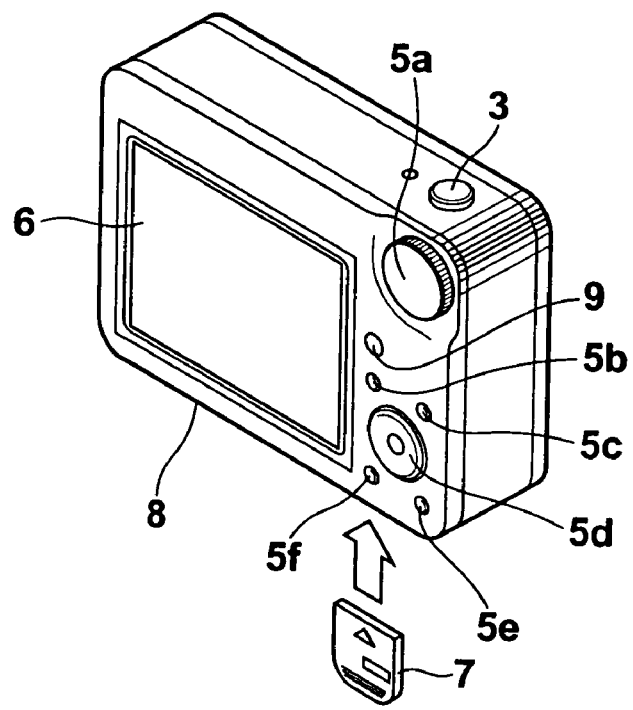
FIG. 1B shows a rear perspective view of the digital camera.

The configuration of the digital camera will be described first. FIGS. 1A and 1B show external views of a digital camera 1. FIG. 1 shows a frontal perspective view of the camera 1 while FIG. 1B shows a rear perspective view thereof. As shown in FIGS. 1A and 1B, the digital camera 1 has a photography lens 2, a shutter release button 3, a microphone 4, an operation dial and operation buttons 5a to 5f, a monitor 6, and an LED lamp 9. A speaker 8 and a slot cover that can open and close (not shown) are situated at the bottom of the digital camera 1. A card slot for inserting a memory card 7 is installed in the slot cover.

FIG. 2 shows the internal configuration of the digital camera 1. As shown in FIG. 2, the digital camera 1 comprises an imaging unit including the photography lens 2, a lens driving unit 16, an iris 13, an iris driving unit 17, a CCD 14, and a timing generator (TG) 18. The photography lens 2 comprises lenses for various functions such as a focus lens for focusing on a subject, and a zoom lens that realizes a zoom function. The lens driving unit 16 adjusts a position of each of the lenses so as to cause a distance from the CCD 14 to be appropriate for a purpose of photography, by using a small motor such as a stepping motor. The iris 13 comprises a plurality of iris blades. The iris driving unit 17 adjusts positions of the iris blades so as to cause an aperture size of the iris to be appropriate for the purpose of photography, by using a small motor such as a stepping motor. The CCD 14 is a 5 to 12 million pixel CCD with a primary color filter, and discharges an electric charge stored in accordance with an instruction signal from the timing generator 18. The timing generator 18 sends to the CCD 14 the signal so as to cause the CCD 14 to store the electric charge for only a desired duration of time, adjusting a shutter speed thereby.

The digital camera 1 also has an A/D conversion unit 15 for converting a signal outputted from the CCD 14 into a digital signal, an image input control unit 23 for transferring image data outputted from the A/D conversion unit 15 to another processing unit via a system bus 24, and a memory 22 for temporarily storing the image data transferred from the image input control unit 23.

The digital camera 1 further includes a focus adjustment unit 20 for focusing the lens by instructing the lens driving unit 16 to move the lens, and an exposure adjustment unit 21 for determining an iris value and the shutter speed and for sending an instruction signal to the iris driving unit 17 and to the timing generator 18. The digital camera 1 also has an image processing unit 25 for carrying out image processing on the image data stored in the memory 22. The image processing unit 25 carries out various kinds of finishing processing for causing an image to look attractive, such as color gradation correction and lightness correction for causing the image to have natural colors and lightness, red eye correction for correcting any red eye included in the image data into an alternate color, and processing for correcting composition in the case where composition of the image is not appropriate. The image data having been subjected to the image processing by the image processing unit 25 are stored again in the memory 22.

In addition, the digital camera 1 has a display control unit 26 for controlling output of the image data stored in the memory 22 to the monitor 6. The display control unit 26 outputs the image data to the monitor 6 after thinning the image data stored in the memory 22 to the number of pixels appropriate for display. The display control unit 26 also controls display of a screen for setting an operation condition or the like.

Moreover, the digital camera 1 comprises a reading writing control unit 27 for controlling writing of the image data stored in the memory 22 in the memory card 7 and loading of image data stored in the memory card 7 into the memory 22. The reading writing control unit 27 records the image data obtained by photography according to a setting set by a user as an Exif (Exchangeable Image File Format) file in the memory card 7, without compression or after compression coding thereof. Exif is a file format determined by Japanese Electronic Industry Development Association (JEIDA). When playback of an image file stored in the memory card 7 is requested, the reading writing control unit 27 loads image data in an Exif file into the memory 22. In the case where the image data have been compressed, the reading writing control unit 27 loads the image data into the memory 22 after decompressing the image data.

The digital camera 1 also includes a LED control unit 19 for carrying out on/off control of the LED 9, and an audio input output control unit 12 for carrying out input/output control of the microphone 4, the speaker 8, an A/D conversion unit 10, a D/A conversion unit 11, and a sound. The audio input output control unit 12 transfers audio data inputted from the microphone 4 and converted into digital data by the A/D conversion unit 10 to the memory 22 via the system bus 24, and the audio data are stored in the memory 22. Audio data supplied to the audio input output control unit 12 from each of processing units and from an overall control unit that will be described later are converted by the D/A conversion unit 11, and outputted to the speaker 8.

The digital camera 1 comprises a timing detection unit 28 for detecting timing to obtain an image. The timing detection unit 28 analyzes the image data and the audio data stored in the memory 22, and outputs a signal indicating the timing when the data in the memory 22 satisfy a predetermined condition.

The digital camera 1 has an overall control unit 30 including a CPU (Central Processing Unit) 31, a RAM (Random Access Memory) 32 that stores operation/control programs, and an EEPROM (Electronically Erasable and Programmable Read Only Memory) 33 that stores various kinds of setting values. The CPU 31 of the overall control unit 30 refers to the setting values stored in the EEPROM 33, and selects and executes one of the programs stored in the RAM 32 according to the setting values. Consequently, the overall control unit 30 sends an instruction signal indicating processing to be carried out to the LED control unit 19, the focus adjustment unit 20, the exposure adjustment unit 21, the image input control unit 23, the image processing unit 25, the display control unit 26, the reading writing control unit 27, the timing detection unit 28, or the audio input output control unit 12, by detecting how the shutter release button 3 or the operation dial/buttons 5a to 5f is/are operated, or by receiving a result of processing by each of the processing units. In this manner, an operation of the digital camera 1 is controlled.

In the ordinary photography mode, the automatic photography mode, and the photography assisting mode, an image is obtained by execution of focus adjustment, exposure control, flash control, image processing, recording, and the like by each of the processing units, under the control of the overall control unit 30. In the playback mode, an image stored in the memory card 7 is outputted to the monitor 6 under the control of the overall control unit 30. In setting mode, a setting screen is displayed on the monitor 6 under the control of the overall control unit 30, and an input of operation is received from the operation dial/buttons 5a to 5f. Information selected from the setting screen by the user operating the operation dial/buttons 5a to 5f, or information inputted from the memory card 7 is stored in the EEPROM 33.

Hereinafter, the automatic photography mode and the photography assisting mode will further be described. FIG. 3 is a flow chart showing an operation of the digital camera 1 set to the automatic photography mode. When set to the automatic photography mode, the digital camera 1 starts generation of image data representing a scene viewed through the lens (S101). The digital camera 1 judges whether composition of an image represented by the generated image data is appropriate (S102). In the case where the composition is appropriate, the digital camera 1 records the image in the memory card 7 (S103) regardless of whether a user has operated the shutter release button 3. In the case where the composition is not appropriate, the digital camera 1 proposes preferable composition (S104), and controls an operation of the imaging unit or causes the image processing unit 25 to carry out predetermined processing (S105) so as to cause the image data generated at Step S101 to have the composition proposed at Step S104. For example, in the case where a major subject is too small, the digital camera 1 causes the imaging unit to zoom. In the case where a major subject is not arranged in a well-balanced manner, the digital camera 1 instructs the image processing unit 25 to carry out image processing wherein a region of the subject is trimmed and moved or enlarged. Alternatively, in the case where a subject to be upright appears oblique, the digital camera 1 causes the image processing unit 25 to carry out rotation processing whereby the subject looks upright.

Image data generated again (S101) by the imaging unit or the image processing unit 25 are re-evaluated at Step S102. The procedures described above are repeated until a mode changing operation is detected (S106).

FIG. 4 is a flow chart showing the operation of the digital camera 1 in the case where the digital camera 1 has been set to the photography assisting mode. When set to the photography assisting mode, the digital camera 1 starts generation of image data representing a scene viewed through the lens (S201). The digital camera 1 then judges (evaluates) composition of an image represented by the image data (S202).

Figure 5:
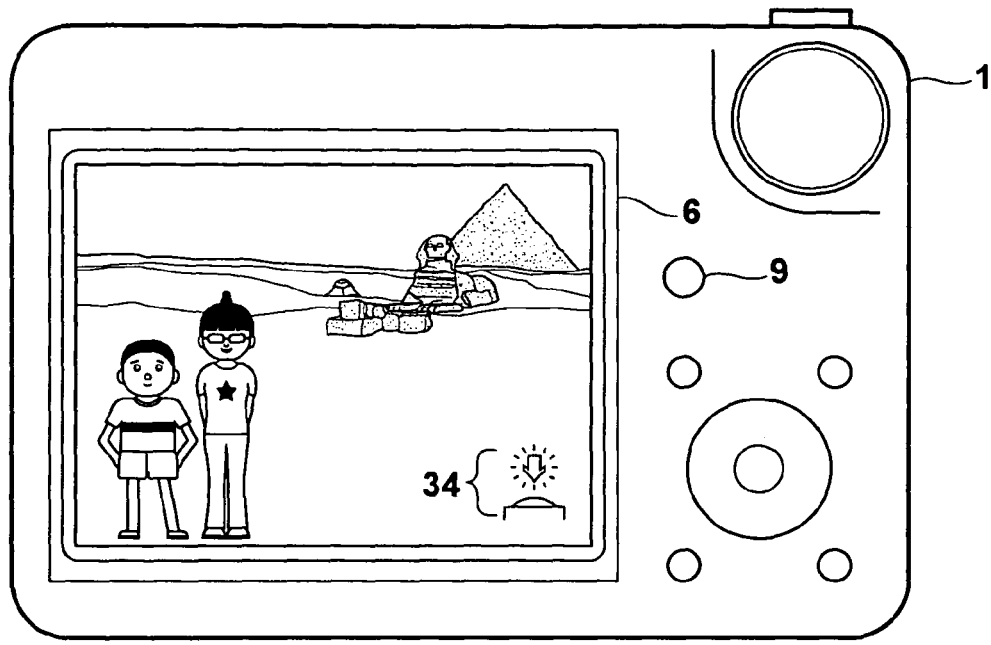
FIG. 5 shows an example of timing notification.
Figure 6:
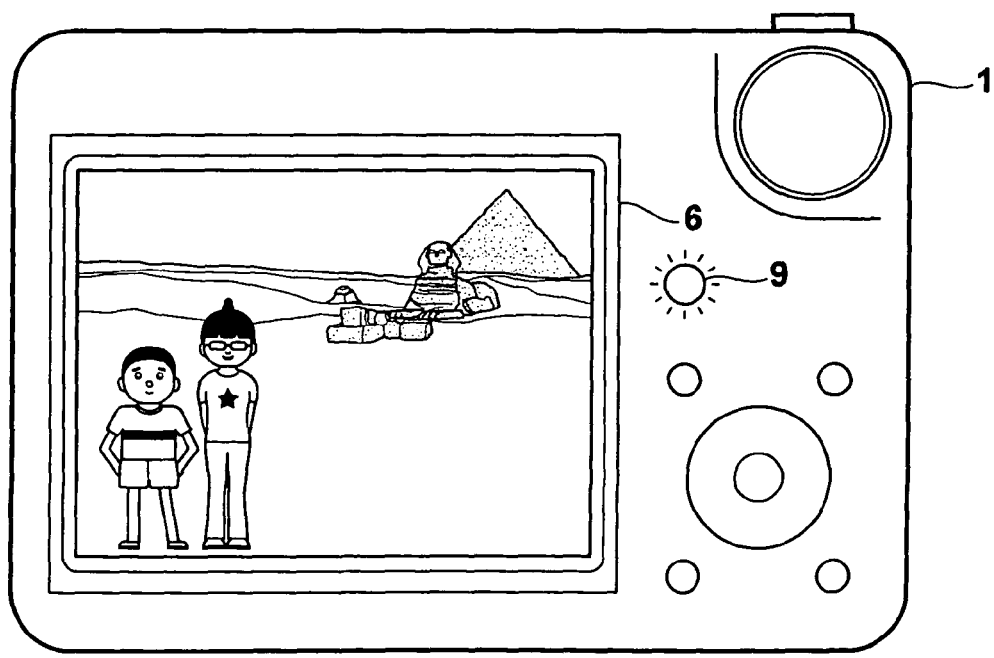
FIG. 6 shows another example of timing notification.

In the case where the composition is appropriate, the digital camera 1 notifies timing to photograph (S203). FIGS. 5 and 6 show examples of how the timing is notified. FIG. 5 shows an example of notification by display of a mark 34 prompting pressing of the shutter release button on the monitor 6. Instead of the mark 34, a message such as "photograph opportunity" may be displayed. In an example in FIG. 6, the timing is notified by causing the LED lamp 9 to blink. In addition, the timing may be notified by a voice from the speaker.

Figure 7:
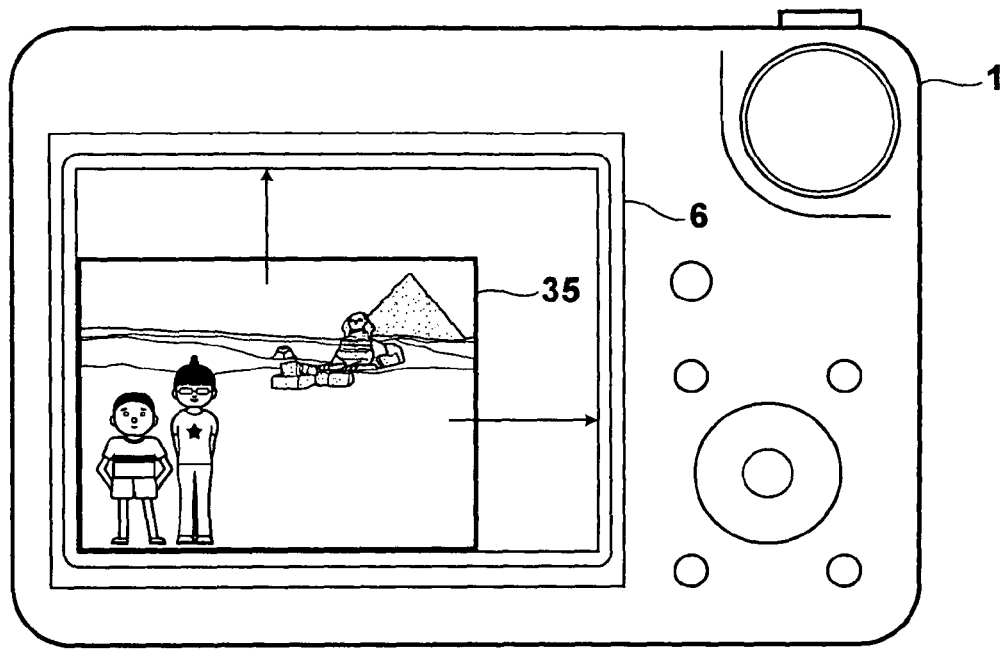
FIG. 7 shows an example of display for assisting photography.
Figure 8:
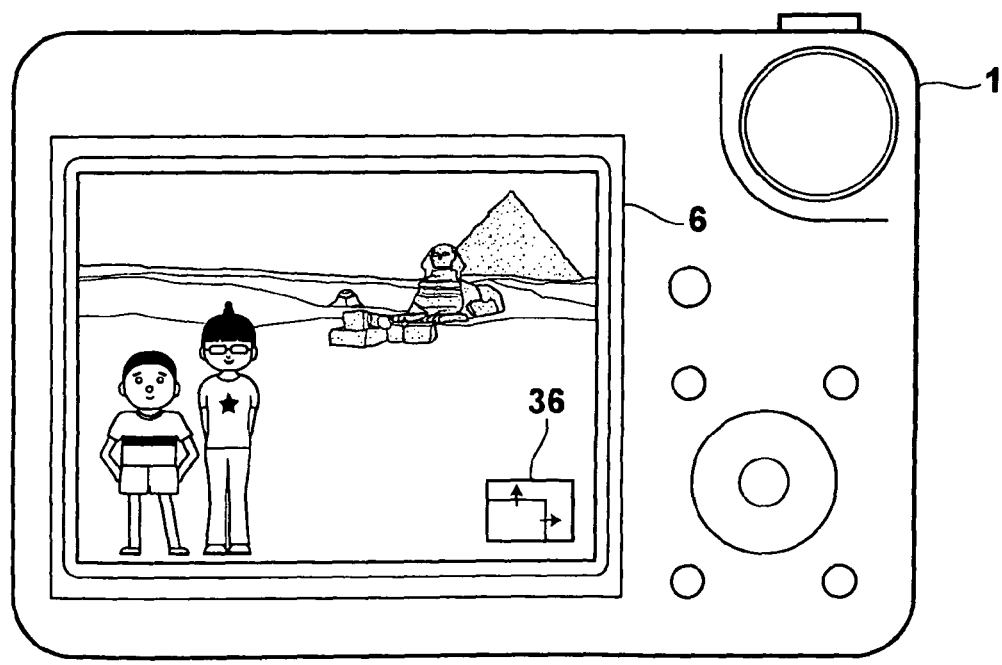
FIG. 8 shows another example of photography assisting display.

In the case where the composition is inappropriate, the digital camera 1 proposes preferable composition (S204). By displaying the proposed composition on the monitor 6 (hereinafter, the display is referred to as assisting display), the digital camera 1 prompts a photographer to change a manner of image capturing by the camera or to operate a predetermined one of the operation buttons (S205). FIGS. 7 and 8 show examples of the assisting display. FIG. 7 shows an example of proposing preferable framing by display of a frame 35 superposed on the image data that have not been subjected to any processing. FIG. 8 shows an example wherein an image of preferable framing generated by image processing is displayed and a mark 36 suggesting how to carry out the framing to obtain the image data being displayed is shown in a screen corner. In addition, a message such as "please zoom" or "please pan the camera slightly to the left" may be displayed or outputted as a voice, in order to propose the preferable framing. In the photography assisting mode, the procedures described above are repeated until a mode changing operation is detected (S206).

Figure 9:
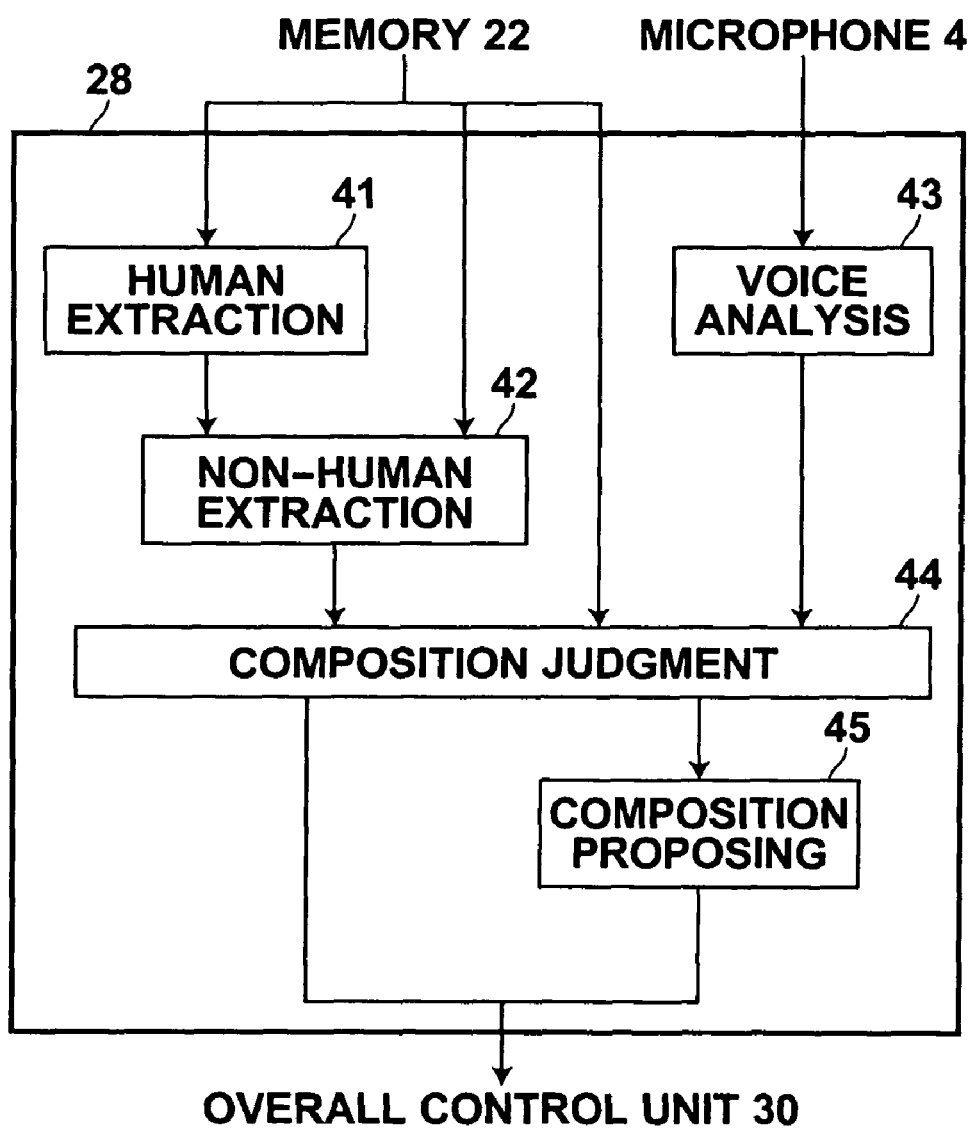
FIG. 9 shows the configuration of a timing detection unit.

Procedures for judging the composition at Steps S102 and S202 and for proposing the composition at Steps S104 and S204 will further be described below in detail. The timing detection unit 28 shown in FIG. 2 carries out the judgment and proposal of the composition. FIG. 9 shows the configuration of the timing detection unit 28. As shown in FIG. 9, the timing detection unit 28 comprises human extraction means 41, non-human extraction means 42, voice analysis means 43, composition judgment means 44, and composition proposing means 45. The timing detection unit 28 may be a circuit comprising an LSI that functions as the means 41 to 45, or a microcomputer in which software for executing the procedures by the means 41 to 45 has been installed.

Figure 10A:
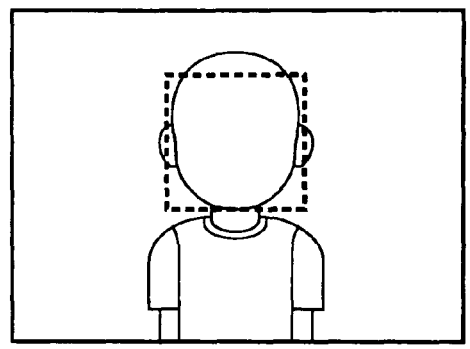
FIG. 10A illustrates face detection processing.
Figure 10B:
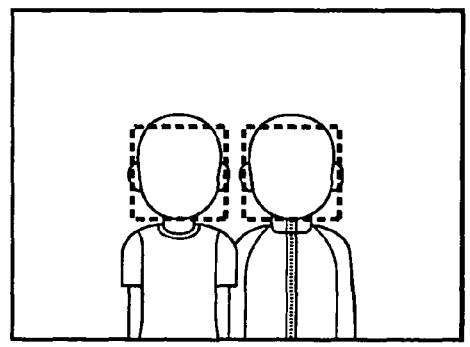
FIG. 10B illustrates the face detection processing.
Figure 10C:
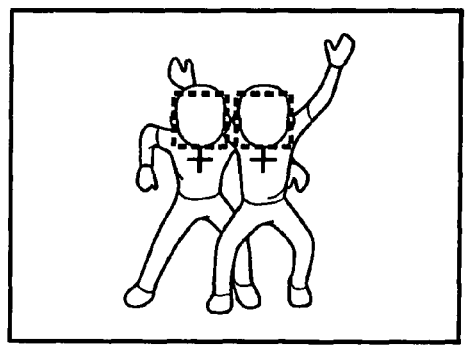
FIG. 10C illustrates the face detection processing.
Figure 10D:
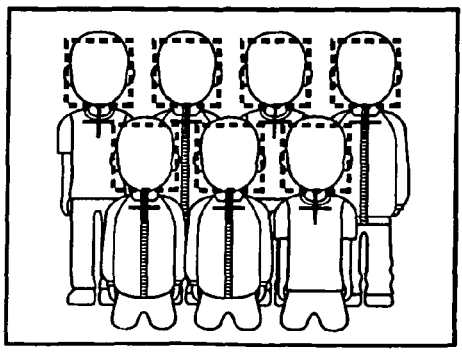
FIG. 10D illustrates the face detection processing.
Figure 11A:
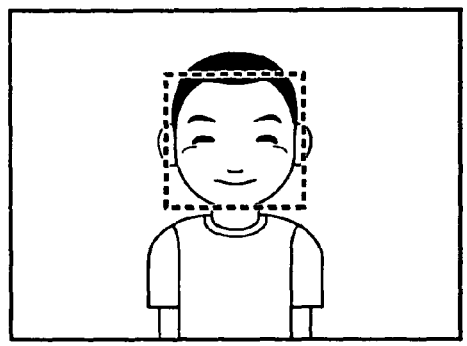
FIG. 11A illustrates facial expression recognition processing.
Figure 11B:
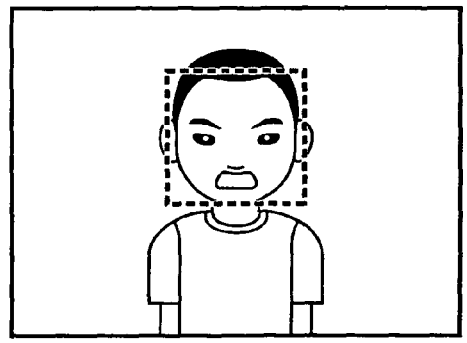
FIG. 11B illustrates the facial expression recognition processing.
Figure 11C:
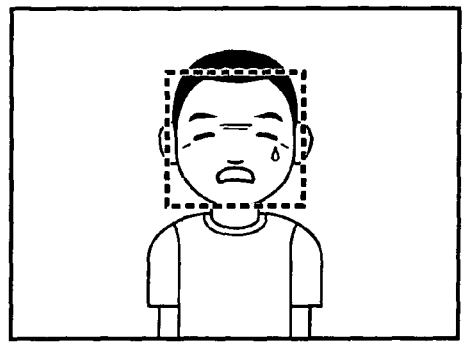
FIG. 11C illustrates the facial expression recognition processing.
Figure 11D:
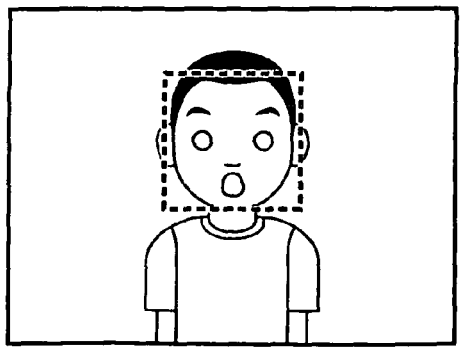
FIG. 11D illustrates the facial expression recognition processing.

The human extraction means 41 reads the image data stored in the memory 22, and searches for any human figure region or regions (hereinafter simply referred to as the human figure regions including the case where the number of human figure regions is one) in the image data. In this embodiment, the human extraction means 41 detects human figures by searching for human faces. In the case where the human extraction means 41 has detected human faces, the human extraction means 41 adds an identifier such as a serial number to each of the faces, and calculates an area of each of face regions, an area of each of regions representing whole bodies including the faces (hereinafter referred to as whole body regions), and coordinates of the center of mass. In the case where the area of any one of the face regions exceeds a predetermined value, coordinates of the mass center of the face region are used as the coordinates of the center of mass. Otherwise, coordinates of the mass center of the corresponding whole body region are used as the coordinates of the mass center. For example, as shown by examples in FIGS. 10A and 10B, the coordinates of the mass center for each of the face regions are calculated in the case where the face regions are comparatively large. In the case where the face regions are comparatively small as shown by examples in FIGS. 10C and 10D, coordinates of the mass center of each of the whole body regions represented by crosshairs are calculated. After searching an entire region, the human extraction means stores the number of human figures having been detected, the extent and the area of each of the face regions, the extent and the area of each of the whole body regions, and the coordinates of the mass center in a memory (not shown) of the timing detection unit 28, as information representing the number of the detected human figures, positions thereof, and sizes thereof.

As methods of detecting a face through a search, various kinds of methods have been known. For example, as has been introduced in Japanese Unexamined Patent Publication No. 2001-051338, a method of detecting a skin color region as a face and a method of detecting a face by judging presence or absence of facial parts having geometric characteristics such as hair, the eyes, and the mouse have been known. Any known method can be used for the face detection by the human extraction means 41.

The human extraction means 41 then recognizes a facial expression of the detected faces. However, facial expression recognition is carried out only in the case where a facial expression recognition function has been set ON in a detailed setting of the automatic photography mode. Alternatively, the facial expression recognition may be carried out only in the case where a size of any one of the detected faces exceeds a predetermined value. In this embodiment, the human extraction means 41 recognizes four facial expressions, namely a smile, anger, a cry, and surprise shown as examples in FIGS. 11A, 11B, 11C, and 11D, respectively. As are obvious from the examples in FIGS. 11A to 11D, these facial expressions respectively have characteristics in how the eyes and the mouse are open and how the eyebrows and the mouse corners are turned up. Therefore, the facial expressions can be recognized based on pictorial characteristics of each of facial parts. As methods of recognizing facial expressions, various kinds of methods such as a method described in Japanese Unexamined Patent Publication No. 2001-051338 have been known. Any known method can be used for the facial expression recognition by the human extraction means 41. The human extraction means 41 stores the recognized facial expression in the memory of the timing detection unit 28.

The human extraction means further recognizes a gesture of the human figures of the detected faces. The gesture recognition is carried out only in the case where a gesture recognition function has been set ON in a detailed setting of the automatic photography mode. Alternatively, in the case where the size of any one of the detected faces exceeds the predetermined value, the facial expression may be recognized while the gesture recognition may be carried out if otherwise.

Figure 12A:
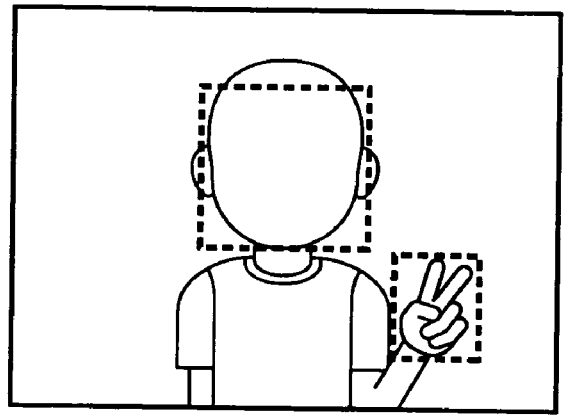
FIG. 12A illustrates gesture recognition processing.
Figure 12B:
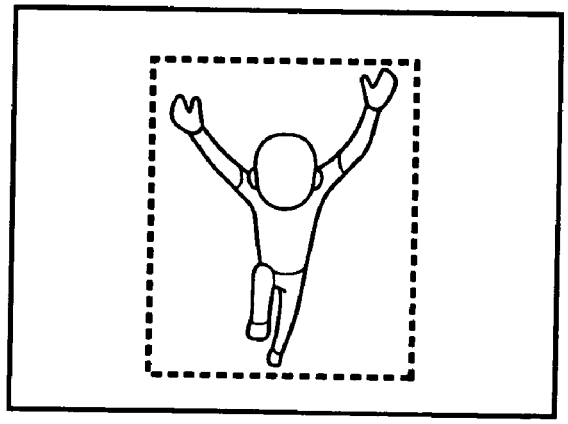
FIG. 12B illustrates the gesture recognition processing.

In this embodiment, the memory of the timing detection unit 28 in advance stores well-known gestures as data representing geometric characteristics of the respective gestures. For example, a gesture represented by open index and middle fingers (peace sign) as shown in FIG. 12A, a gesture represented by arms raised into the air (hurrah or victory pose) as shown in FIG. 12B, a gesture represented by placing the tip of the index finger in contact with the tip of the thumb to form a rough circle while raising the remaining fingers (OK or money in Japan), and a gesture as a thumbs-up sign (good) have been registered in advance. The human extraction means 41 compares geometric characteristics extracted from a region around each of the detected faces in the image data read from the memory 22 with the registered data. In the case where the extracted characteristics agree with the characteristics of one of the registered gestures, the human extraction means 41 stores the name or a predetermined identifier of the gesture in the memory of the timing detection unit 28.

Various kinds of methods have also been known as methods of gesture recognition, including a method described in Japanese Unexamined Patent Publication No. 2001-051338. Any known method can be used for the gesture recognition processing by the human extraction means 41.

Thereafter, the human extraction means 41 calculates a total area of the face regions. For example, in the examples shown in FIGS. 10A to 10D, the human extraction means 41 calculates the total area of the regions shown by dashed frames. However, the human extraction means may calculate a total area of the whole body regions.

In the case where the calculated total area of the regions exceeds a predetermined threshold value, the human extraction means 41 supplies information of the number of faces, the area of each of the face regions, the area of each of the whole body regions, the coordinates of the mass center, the facial expression, and the gesture stored in the memory of the timing generator 28, only to the composition judgment means 44. Otherwise, the human extraction means 41 supplies the information stored in the memory to the composition judgment means 44 and to the non-human extraction means 42.

Figure 13A:
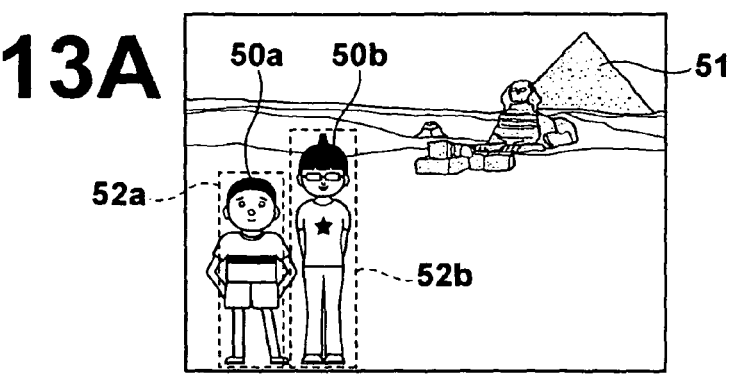
FIG. 13A illustrates processing for extraction of a non-human subject.
Figure 13B:
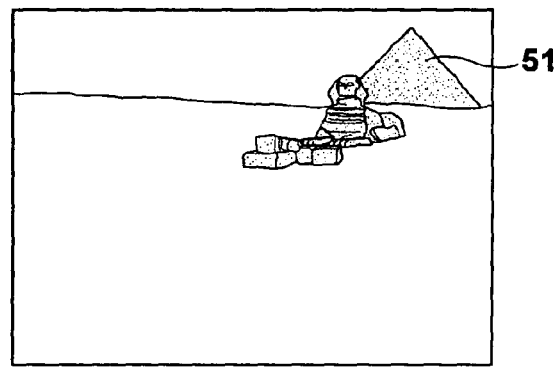
FIG. 13B illustrates the non-human subject extraction processing.

The non-human extraction means 42 extracts a major subject other than the human figures in the image data. In this embodiment, the non-human extraction means 42 reads the image data stored in the memory 22, and deletes a portion of the image data corresponding to the human figure regions from the image data by replacing pixel values of the regions corresponding to the human figures including the faces or the bodies thereof by 0, or by another method. For example, assume that the image data read from the memory 22 are image data including a person 50a, a person 50b, and a subject 51 other than the persons, as shown in FIG. 13A. The human extraction means 41 has supplied the information of the coordinates of the mass center and the like for regions 52a and 52b surrounded by dashed frames. By deleting the portion of the image data corresponding to the human figure regions 52a and 52b from the image data, the remaining image data including only the subject 51 are obtained as shown in FIG. 13B.

Figure 13C:
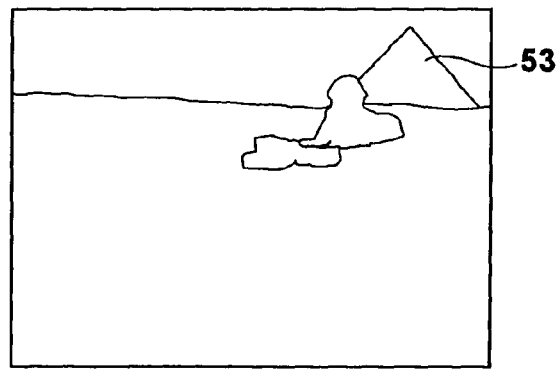
FIG. 13C illustrates the non-human subject extraction processing.
Figure 13D:
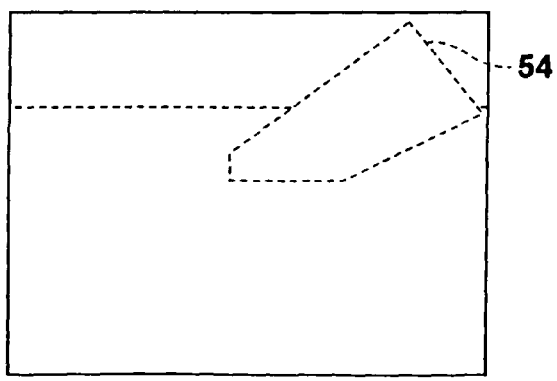
FIG. 13D illustrates the non-human subject extraction processing.

The non-human extraction means 42 carries out filtering processing using a high-pass filter on the image data excluding the information of the human figure regions 52a and 52b. In this manner, an edge image 53 in which edges of the subject 51 have been extracted is obtained as shown in FIG. 13C, for example. The edge image 53 is an image comprising outlines of the subject other than the human figures in the image data, and a rough region 54 in which the subject 53 is situated can be identified as shown in FIG. 13D by analyzing the edge image. The non-human extraction means 42 calculates an area and coordinates of the mass center of the identified region 54, and supplies the calculated area and coordinates to the composition judgment means 44.

Instead of the high-pass filtering processing, a method of extracting only a specific frequency component (corresponding to the edges) by Fourier transform may be carried out as a method of identifying the subject region other than the human figures. Alternatively, a method of extracting a major subject by analysis using color information can be adopted instead of frequency analysis. For example, in the case where a pixel value represents a predetermined color, the value is left as it is. Otherwise, the value is replaced by 0 or 1. In this manner, an image is divided into two regions, and an area in which a subject of the predetermined color is situated or an area in which a subject of a color other than the predetermined color is located is extracted. In addition, for a target that tends to be photographed frequently with a person (such as an animal popular as a pet), data representing a subject region can be generated by recognition using a judgment algorithm such as an Ada boost algorithm based on learning.

Meanwhile, image sharpness sometimes depends on a shutter speed at the time of acquisition of image data while image colors depends on a photometric value or iris in some cases. Therefore, recognition of the subject region may become easier by considering various kinds of adjustment values and setting values at the time of the image analysis.

Figure 14:
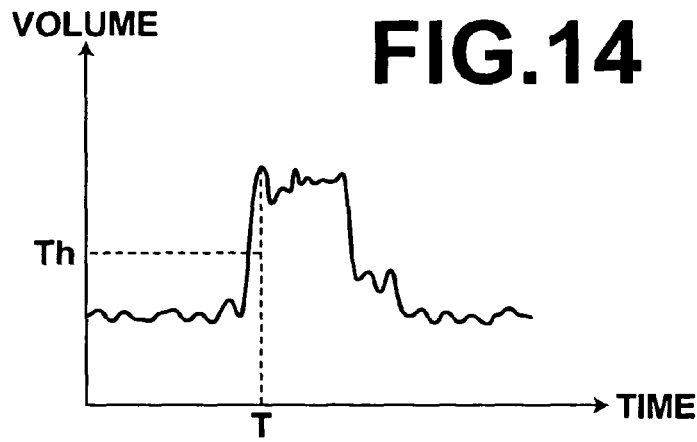
FIG. 14 shows an example of voice analysis.

The voice analysis means 43 analyzes a voice inputted from the microphone 4, and detects the following voice. However, in this embodiment, the following procedures are carried out only in the case where a voice analysis function has been set ON. Firstly, the voice analysis means 43 constantly measures a volume of a voice inputted from the microphone 4, and compares the volume with a predetermined threshold value. FIG. 14 is a graph of time and the volume represented by the horizontal and vertical axes, respectively. The voice analysis means 43 detects time T in the example in FIG. 14, that is, the time the volume suddenly increases and exceeds a threshold value Th. In photography of a sport game or a party, an instance at which a cheer is raised, such as the time a goal is scored in a football game or the time a toast is given in a wedding ceremony, is often a photograph opportunity. Therefore, by detecting the time at which the volume changes suddenly, the photograph opportunity can be detected. Alternatively, instead of detecting the volume change, detection of only the volume exceeding the threshold value Th may be carried out, since a time during which a cheer is being raised can always be thought as a photograph opportunity. On the contrary, in the case where the time at which it becomes quiet is a photograph opportunity, such as the case where the face of a sleeping baby is photographed, the time at which the volume becomes lower than a threshold value or a state in which the volume is lower than the threshold value may be detected. Which time needs to be detected as a result of volume analysis can be changed according to a setting.

The voice analysis means 43 also recognizes a phrase spoken by the voice, and compares the phrase with pre-registered specific phrases. The registered data are stored in the memory of the timing detection unit 28, and phrases such as "Say cheese" or "Drink a toast" spoken highly likely in synchronization with timing to press a shutter release button have been stored. In this embodiment, a voice can be registered as one of the registered data, and the voice may be registered in relation to a phrase. The voice analysis means 43 can detect (a) the time one of the registered phrases is spoken by a voice, (b) the time the person whose voice has been registered produces the voice, and (c) the time the person speaks the phrase as the voice, by comparison with the registered data. Which of the times (a) to (c) is detected is determined in principle by a setting. However, depending on a state of registration of the data, processing different from the setting may be carried out. For example, even in the setting to detect the time (c), the time (a) is detected in the case where no voice has been registered.

Whether the detection by the volume and the detection by comparison of the phrases are carried out both or which one of the detections is carried out depends on a setting.

Procedures carried out by the composition judgment means 44 will be described next. As shown in FIG. 9, the composition judgment means 44 is provided with the image data read from the memory 22, the extraction results from the human extraction means 41 and the non-human extraction means 42, and the detection result from the voice analysis means 43. However, in the case where the extraction or the detection has not been carried out, a value (such as 0) representing no information to be provided is inputted thereto.

Figure 15:
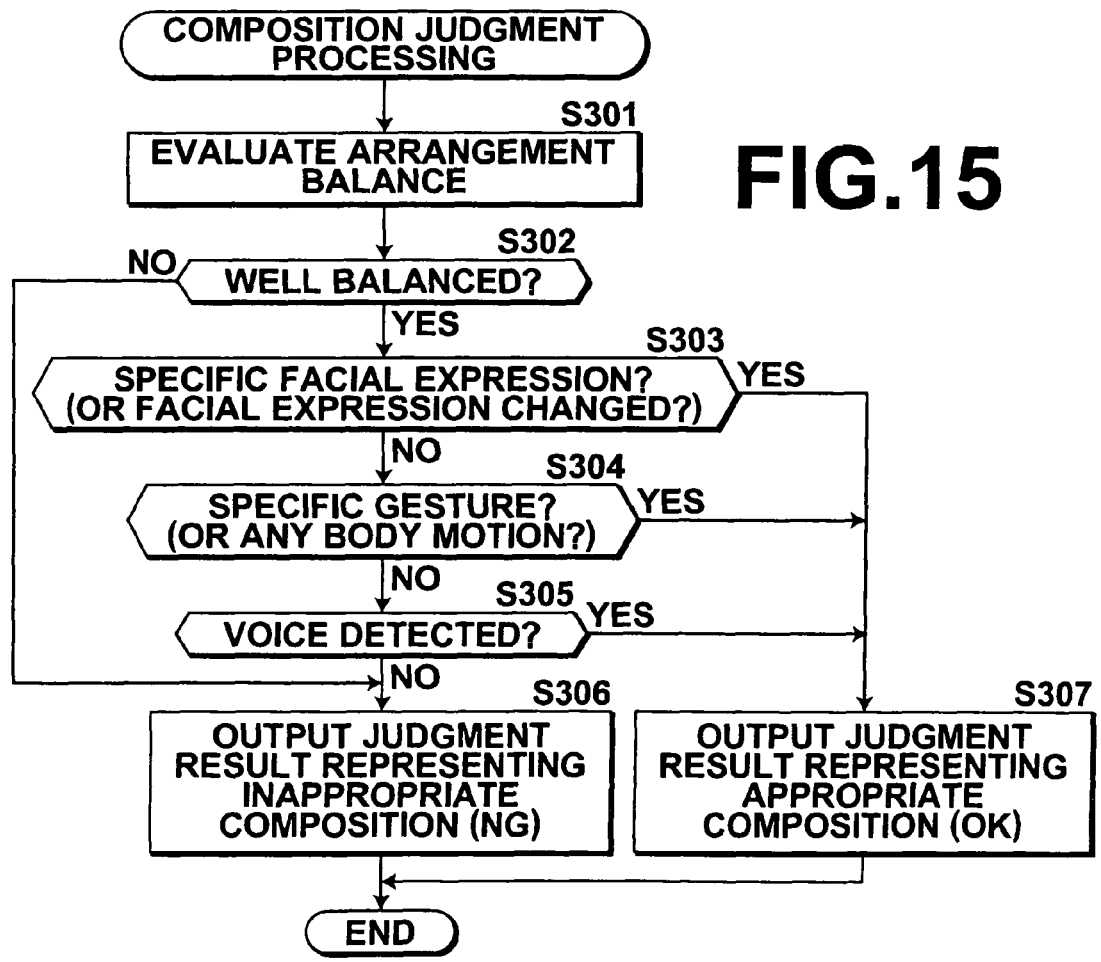
FIG. 15 is a flow chart showing an example of composition judgment processing.
Figure 16:
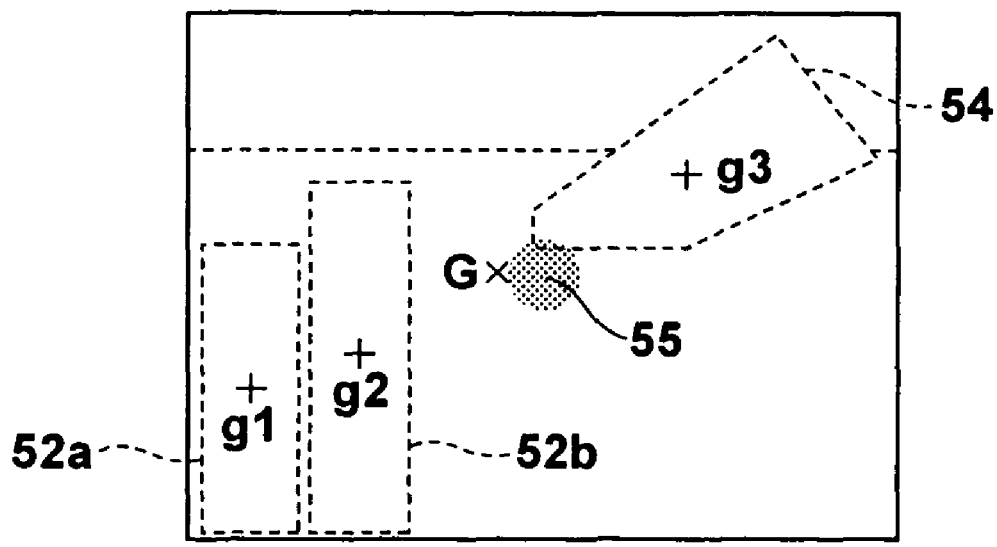
FIG. 16 illustrates the composition judgment processing.

FIG. 15 is a flow chart showing an example of the procedures carried out by the composition judgment means 44. The composition judgment means 44 receives the information of the extent and the area of each of the face regions, the extent and the area of each of the whole body regions, the coordinates of the mass center, the facial expression, and the gesture from the human extraction means 41, the information of the extent, the area, and the coordinates of mass center of the subject other than the human figures from the non-human extraction means 42, and the information of voice analysis result from the voice analysis means 43.

The composition judgment means 44 firstly evaluates a balance of arrangement of the subjects including the human figures (S301). In the case where the human extraction means 41 and the non-human extraction means 42 respectively have detected N people (where N is an integer) and M subjects (where M is an integer), the composition judgment means 44 calculates coordinates of mass center for the N+M regions as a whole, based on the coordinates of the mass center of the human regions and the subject regions having been extracted. For example, for the example represented by the images shown in FIGS. 13A to 13D, the composition judgment means 44 calculates the coordinates of mass center G of the three regions as a whole, namely the human regions 52a and 52b and the subject region 54, according to the coordinates of mass center g1 of the region 52a, the coordinates of mass center g2 of the region 52b, and the coordinates of mass center g3 of the subject region 54. The composition judgment means 44 judges that the balance of arrangement is appropriate if the mass center G is within a predetermined region 55 in a center portion of the image. Otherwise, the composition judgment means 44 judges that the balance is not appropriate.

Figure 17:
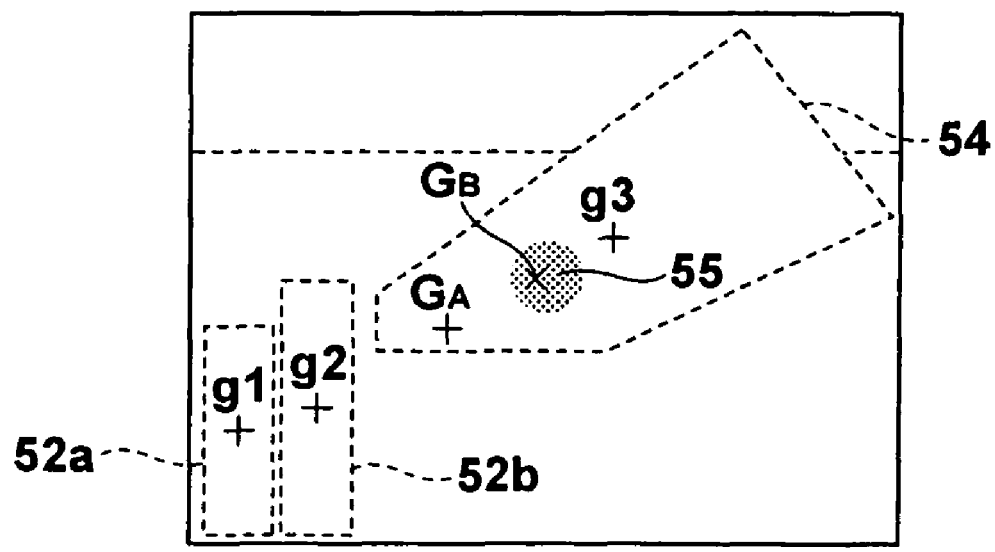
FIG. 17 illustrates the composition judgment processing.

In the case where the coordinates of the mass center for the N+M regions as a whole are calculated, the coordinates may be found after weighting the coordinates of the mass center of each of the regions according to the area thereof. If each of the regions is weighted more as the area thereof becomes larger, the mass center of the regions is located closer to the region of the larger area. For example, in an example shown in FIG. 17, the mass center found by equal weighting of the regions is located at a point GA that is outside the region 55. Therefore, the composition judgment means 44 judges that the arrangement balance is not appropriate. However, in the case where the regions are weighted more as the areas thereof become larger, the calculated mass center is located at a point GB inside the region 55. Therefore, the arrangement balance is judged to be appropriate.

The composition judgment means 44 also evaluates a rotation deviation for some subjects, in addition to the arrangement balance evaluation. The rotation deviation refers to a difference in a direction or orientation of a subject in an image from a direction or orientation of the subject in the real world. For example, in the case where a skyscraper that is supposed to be upright in an image looks oblique, the composition judgment means 44 judges that the rotation deviation is observed. In the case where the non-human extraction means 42 extracts a subject by using a judgment algorithm based on learning, the non-human extraction means 42 can judge not only an outline of the subject but also the type of the subject. For such a subject, the non-human extraction means 42 supplies information representing the type of the subject to the composition judgment means 44. In the case where the extracted subject is an object to appear vertically or horizontally in the real world, such as a skyscraper or the horizon, the composition judgment means 44 calculates the direction or orientation of the extracted subject, and judges presence or absence of the rotation deviation.

In the case where the composition judgment means 44 has judged that the arrangement balance is not appropriate or in the case where the composition judgment means 44 has judged that the rotation deviation is observed at Step S302, the composition judgment means 44 outputs a result of judgment (NG) representing inappropriate composition (S306).

In the case where the composition judgment means 44 has judged that the arrangement balance is appropriate and that the rotation deviation is not observed, the composition judgment means 44 then judges whether the facial expression of the human figures is a specific facial expression that is worth photography, based on the facial expression information supplied by the human extraction means 41 (S303). Alternatively, the composition judgment means 44 judges whether the facial expression has been changed, by comparison with the facial expression information supplied immediately before the judgment. However, the judgment of the facial expression may be carried out only in the case where the area of any one of the detected face regions exceeds the predetermined value. In the case where the facial expression is the specific expression (or in the case where a change in the facial expression has been observed), the composition judgment means 44 outputs a result of judgment (OK) representing appropriate composition (S307).

In the case where the facial expression is not the specific expression (or in the case where no change is observed in the facial expression), the composition judgment means 44 judges whether any one of the human figures is showing a gesture that is worth photography, based on the information of the gesture supplied from the human extraction means 41 (S304). Alternatively, the composition judgment means 44 judges whether a change is observed in motion of the human figures, by comparison with the gesture information supplied immediately before the judgment. However, the gesture judgment may be carried out only in the case where the area of any one of the human figure regions is a predetermined value or larger. In the case where the specific gesture or the motion change is observed, the composition judgment means 44 outputs a result of judgment representing appropriate composition (S307).

In the case where the specific gesture or the motion change is not observed, the composition judgment means 44 judges whether the specific voice has been detected, based on the information supplied from the voice analysis means 43 (S305). In the case where the specific voice has not been detected, the composition judgment means outputs a judgment result representing inappropriate composition (S306). In the case where the specific voice has been detected, the composition judgment means 44 outputs a judgment result representing appropriate composition (S307).

In the case where the judgment result representing appropriate composition has been outputted from the composition judgment means 44, the timing detection unit 28 sends the judgment result to the overall control unit 30. The overall control unit 30 having received the result instructs the reading writing control unit 27 to record the image data stored in the memory 22 in the memory card 7 in the case where the digital camera 1 has been set to the automatic photography mode. In the case where the digital camera 1 has been set to the photography assisting mode, the overall control unit 30 instructs the display control unit 26 to display the mark or message indicating a photograph opportunity on the monitor (see FIG. 5). Alternatively, the overall control unit 30 instructs the LED control unit 19 to blink the LED 9 (see FIG. 6).

In this embodiment, the reading writing control unit 27 records the information used for the judgment of composition in the memory card 7, as accompanying information of the image data. More specifically, the information is recorded in a tag of an Exif file. In the case where the composition has been judged inappropriate, the composition judgment means 44 supplies the information used for the judgment to the composition proposing means 45. The composition proposing means 45 carries out the following procedures by using the information.

Figure 18A:
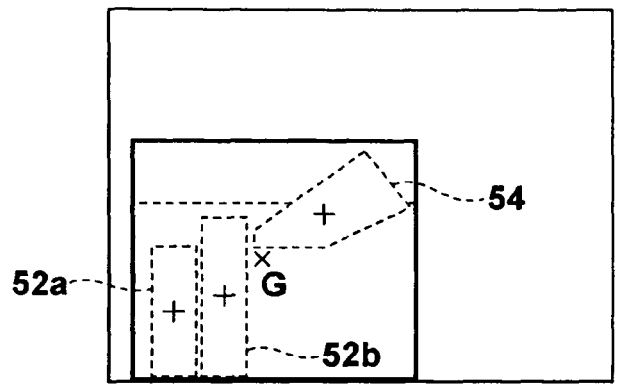
FIG. 18A illustrates composition proposing processing.
Figure 18B:
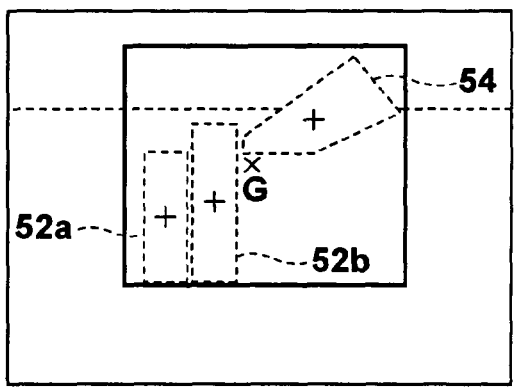
FIG. 18B illustrates the composition proposing processing.
Figure 18C:
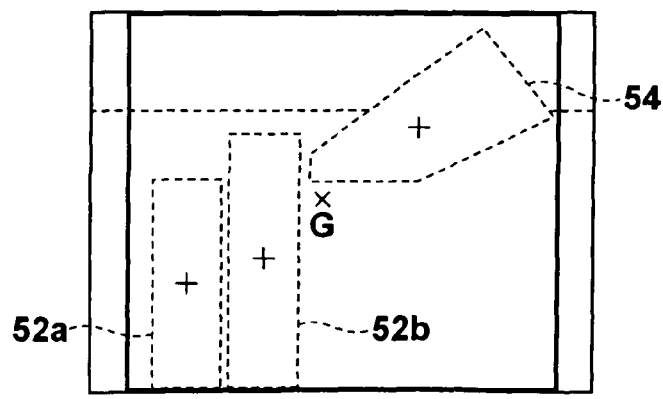
FIG. 18C illustrates the composition proposing processing.

The composition proposing means 45 analyzes the information supplied from the composition judgment means 44, and proposes preferable composition for the image whose composition has been judged inappropriate. Proposing composition refers to determining an arrangement that satisfies a composition judgment condition. The determined composition is outputted together with information of processing to be carried out for obtaining an image in the composition. For example, as shown by an example in FIG. 18A, in the case where the regions 52a, 52b, and 54 extracted in the image are generally arranged to the lower left, composition wherein the mass center G of the regions 52a, 52b, and 54 is positioned in a center portion of the image as shown in FIG. 18B is proposed. Alternatively, as shown by an example in FIG. 18C, composition wherein the mass center G of the regions 52a, 52b, and 54 is located in the center portion of the image and the subjects appear larger is proposed. Two type of information is outputted as the information of the processing to be carried out for acquisition of the image in the proposed composition.

First information outputted by the composition proposing means 45 is information necessary to cause the image data obtained in photography to be converted into image data of the preferable composition by image processing. For example, in the example in FIG. 18B, information of a region of trimming (the bold frame in FIG. 18B) and a direction of movement of the mass center G (a movement vector) is outputted. In the example show in FIG. 18C, information of the trimming region, the direction of movement, and a magnification is output, for example.

Second information outputted by the composition proposing means 45 is information necessary for obtaining the image data of the preferable composition by re-photography. For example, in the example shown in FIG. 18B, information representing an operation to pan the camera to the left is outputted. In the example in FIG. 18C, information representing the operation to pan the camera to the left and a magnification to be set is outputted.

For the rotation deviation as another cause of inappropriate composition, information representing a direction and an angel of rotation for inclination correction is outputted by the composition proposing means 45 as the first information while information to incline the camera to the left or right is outputted as the second information. In the case where a cause of inappropriate composition is the facial expression, the gesture, or the voice, correction by image processing cannot be carried out. Therefore, information representing that the cause is the facial expression, the gesture, or the voice is outputted.

The information outputted by the composition proposing means 45 is sent to the overall control unit 30. The overall control unit 30 having received the information judges whether the digital camera 1 has been set to the automatic photography mode or the photography assisting mode, and carries out the processing according to the mode.

In the case where the digital camera 1 has been set to the automatic photography mode, the overall control unit 30 instructs the image processing unit 25 to read the image data from the memory 22 and to carry out the image processing necessary for improving the composition (such as trimming, enlargement/reduction, and rotation). The overall control unit 30 also instructs the display control unit 26 to display the image data processed by the image processing unit 25 on the monitor 6. In addition, the overall control unit 30 instructs the reading writing control unit 27 to record the image data processed by the image processing means 25 in the memory card 7.

Figure 19:
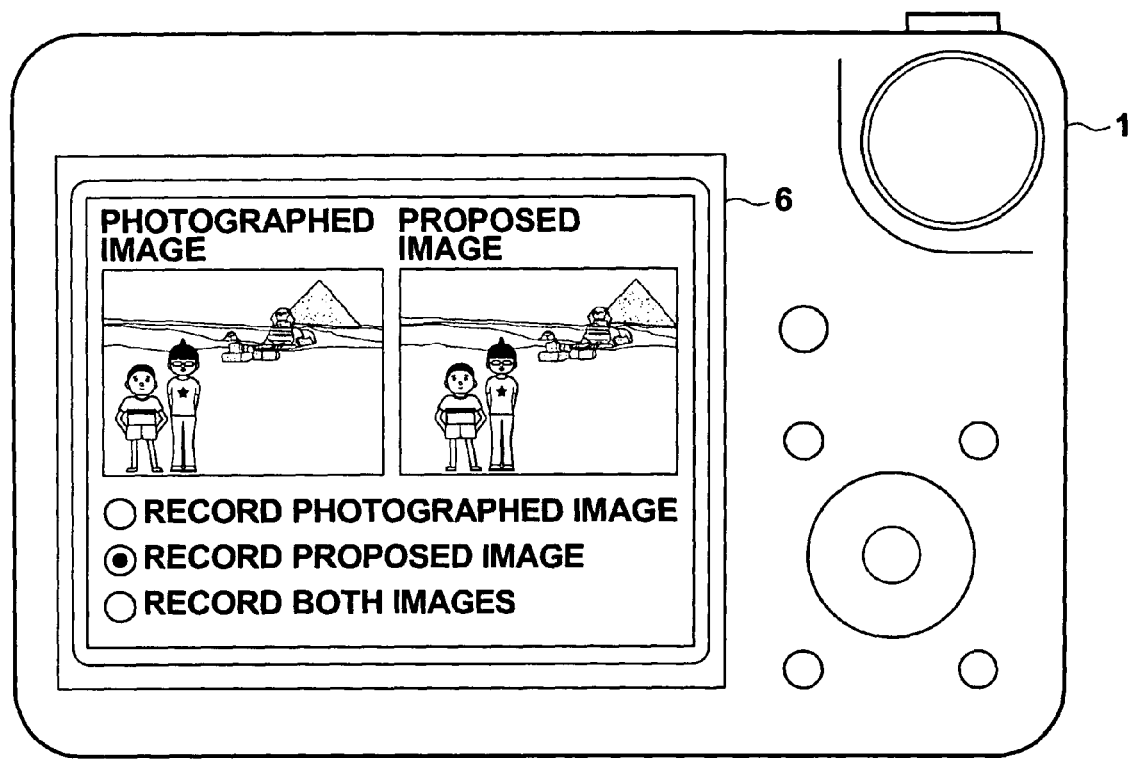
FIG. 19 shows an example of a screen for selecting an image to be recorded.

In this embodiment, upon reception of the instruction, the display control unit 26 displays a selection screen as shown in FIG. 19 to let the user select whether the data of the image in the photographed composition (the photographed image), or the data of the image in the proposed composition (a proposed image), or both the photographed image and the proposed image are recorded. The reading writing control unit 27 records the image data selected in the screen in the memory card 7. However, without display of the selection screen, only the proposed image or the proposed image together with the photographed image may be recorded.

In this embodiment, the reading writing control unit 27 having received the instruction records the information used for the judgment of composition by the composition judgment means 44, that is, the information of the coordinates of mass center of the N+M regions as a whole, the orientation of the subject whose rotation deviation has been detected, the facial expression and the gesture, and the detected voice, as the accompanying information of the image data in the memory card 7. Furthermore, the reading writing control unit 27 records the first information outputted by the composition proposing means 45, that is, the information necessary for causing the image data obtained in photography to be converted into the image data of the preferable composition, as the accompanying information of the image data in the memory card 7. More specifically, the information described above is recorded in the tag of the Exif file.

The information recorded in the tag of the Exif file can be used when the image is edited on a personal computer. For example, an image equivalent to the proposed image can be generated by a personal computer if the photographed image and the first information outputted by the composition proposing means 45 are available. Therefore, a size of the image file can be reduced by not recording the proposed image. Moreover, an image in composition that is slightly different from the composition proposed by the composition proposing means 45 can be generated through editing of the photographed image based on the first information outputted by the composition proposing means 45.

In the case where the digital camera 1 has been set to the photography assisting mode, the overall control unit 30 instructs the image processing unit 25 to read the image data from the memory 22 and to carry out the processing necessary for improving the composition (such as trimming, translation, enlargement/reduction, and rotation). The overall control unit 30 also instructs the display control unit 26 to display the image data processed by the image processing unit 25 and the mark or message generated according to the second information outputted by the composition proposing means 45. In this manner, the assisting display described with reference to FIGS. 7 and 8 is carried out.

In this embodiment, if the digital camera is set to the automatic photography mode, the image data are recorded automatically in the memory card when the arrangement balance is appropriate and the predetermined facial expression, the gesture, or the voice has been detected. Therefore, an image in appropriate composition can always be obtained even by a person who is not familiar with photography. In addition, the digital camera does not respond in the case where the predetermined voice alone has been detected. Therefore, a photography operation is not carried out unnecessarily before the camera captures a subject or in response to a voice of a person who happens to be close to the scene of photography. In other words, inconvenience of unnecessary photography is solved while convenience of automatic photography using a voice as a trigger is retained.

In the photography assisting mode, the photographer is notified of the photograph opportunity. Therefore, by pressing the shutter release button at the notified timing, the image in appropriate composition can be easily obtained while convenience equivalent to the automatic photography can be enjoyed. This notification is not carried out in the case where the predetermined voice alone has been detected. The notification is carried out only in the case where the arrangement balance is appropriate in the image and the facial expression change, the gesture, or the voice indicating appropriate composition is also detected. Therefore, erroneous notification is not carried out.

In the case where the image is not obtained in appropriate composition, an operation of the imaging unit is controlled so as to obtain the image in appropriate composition or image processing is carried out on the image having been obtained. Therefore, the user can obtain the image in appropriate composition without changing a position to stand at, or without changing a manner of image capturing, or without adjusting a setting such as a magnification.

In the above embodiment, the methods of judgment/proposing such as the method of judging or proposing the composition by calculating the coordinates of mass center for each of the regions have been described. However, various kinds of conditions and data can be listed as the condition to be satisfied by the composition and the data to be used for the judgment, and the condition and the data are not necessarily limited to the examples shown in the embodiment described above. In the above embodiment, the case of still image photography has been described as an example. However, the present invention is useful to determine timing of starting photography of a moving image.

What is claimed is:

1. An imaging apparatus, comprising:
    imaging means for generating image data representing a scene by photography of the scene;
    recording means for recording the image data generated by the imaging means in a predetermined recording medium;
    human extraction means for carrying out extraction of an image region or image regions representing a human figure or human figures by analyzing the image data generated by the imaging means;
    voice analysis means for carrying out detection of a predetermined characteristic related to a voice by analysis of an inputted voice;
    composition judgment means for carrying out judgment as to whether composition of the image data is appropriate, based on a result of the extraction by the human extraction means and a result of the detection by the voice analysis means; and
    recording timing determination means for determining a timing of recording the image data, based on a result of the judgment by the composition judgment means,
    wherein the human extraction means carries out a human face search in the image data, and outputs information representing a number of human faces detected through the search and a position and a size of each of the human faces, as the result of the extraction,
    wherein the recording means records the result of the extraction by the human extraction means and the result of the detection by the voice analysis means together with the image data in the recording medium,
    wherein the composition judgment means evaluates a balance of arrangement based on whether a mass center of the human figures is within a predetermined region in a center portion of an image or outside the predetermined region,
    wherein, in a case the balance of arrangement is appropriate, the composition judgment means judges whether a facial expression of the human figures comprises a specific facial expression or whether facial expression has been changed, based on a facial expression information supplied by the human extraction, means; and
    wherein, in a case that the facial expression comprises the specific facial expression or has been changed, the composition judgment means outputs a judgment result representing an appropriate composition.

2. The imaging apparatus according to claim 1, further comprising recording control means for controlling the recording means so as to record the image data at the timing determined by the recording timing determination means.

3. The imaging apparatus according to claim 1, further comprising notification means for notifying the timing determined by the recording timing determination means.

4. The imaging apparatus according to claim 1, wherein the voice analysis means detects a predetermined volume change as the predetermined characteristic.

5. The imaging apparatus according to claim 1, wherein the voice analysis means detects a predetermined phrase as the predetermined characteristic.

6. The imaging apparatus according to claim 1, wherein the voice analysis means detects a characteristic that has been pre-registered as a characteristic of a voice of a predetermined person, as the predetermined characteristic.

7. The imaging apparatus according to claim 1, wherein the human extraction means recognizes a facial expression of a human face or the human faces detected in the search and further outputs information representing the recognized facial expression.

8. The imaging apparatus according to claim 1, wherein the human extraction means recognizes a gesture of the human figure or figures included in the image data and outputs information representing the recognized gesture as the result of the extraction.

9. The imaging apparatus according to claim 1, wherein information representing the position and the size of said each of the human faces are recorded together with the predetermined characteristic related to the voice by analysis of the inputted voice.

10. A control method of an imaging apparatus having imaging means for generating image data representing a scene by photography of the scene and recording means for recording the image data generated by the imaging means in a predetermined recording medium, the method comprising:
- carrying out extraction of an image region representing a human figure by analysis of the image data generated by the imaging means;
- carrying out detection of a predetermined characteristic related to a voice by analysis of an inputted voice;
- carrying out judgment as to whether composition of the image data is appropriate, based on a result of the extraction and a result of the detection; and
- determining a timing to record the image data, based on a result of the judgment,
- wherein the carrying out extraction includes carrying out a human face search in the image data, and outputting information representing a number of human faces detected through the search and a position and a size of each of the human faces, as the result of the extraction,
- wherein the recording means records the result of the extraction and the result of the detection by the analysis of the inputted voice together with the image data in the recording medium, and
- wherein the carrying out judgment comprises:
  - evaluating a balance of arrangement based on whether a mass center of the human figures is within a predetermined region in a center portion of an image or outside the predetermined regions;
  - in a case the balance of arrangement is appropriate, judging whether a facial expression of the human figures comprises a specific facial expression or whether facial expression has been changed on a facial a expression information supplied by the human extraction means: and
  - in a case that the facial expression comprises the specific facial expression or has been changed, outputting a judgment result representing an appropriate composition.

11. The control method of the imaging apparatus according to claim 10, further comprising controlling the recording means so as to record the image data at the determined timing.

12. The control method of the imaging apparatus according to claim 10, further comprising notifying a user of the determined timing by control of an operation of predetermined output means.

13. The control method of the imaging apparatus according to claim 10, wherein information representing the position and the size of said each of the human faces are recorded together with the predetermined characteristic related to the voice by analysis of the inputted voice.

* * * * *